Dec. 14, 1965  E. F. CARRA, JR., ETAL  3,223,176
SUPPORT MECHANISM FOR A DISPLACEABLE EARTH MOVING TOOL
Filed Oct. 5, 1964  2 Sheets-Sheet 1

INVENTORS
EMIL F. CARRA, JR.
PHILIP D. WENZEL
BY Wilson, Settle, & Craig
ATTORNEYS INVENTORS
EMIL F. CARRA, JR.
PHILIP D. WENZEL
BY Wilson, Settle & Craig
ATTORNEYS

United States Patent Office 3,223,176
Patented Dec. 14, 1965

3,223,176
SUPPORT MECHANISM FOR A DISPLACEABLE
EARTH MOVING TOOL
Emil F. Carra, Jr., and Philip D. Wenzel, Rockford, Ill., assignors to J. I. Case Company, Racine, Wis., a corporation of Wisconsin
Filed Oct. 5, 1964, Ser. No. 401,385
9 Claims. (Cl. 172—265)

The present invention relates to support mechanisms to which earth working tools, such as plows, are attached. More specifically, the invention relates to support mechanisms having selectively rotatable kinematic means accommodating smooth rotational tripping or breakback of the attached earth working tool when the tool is rotationally displaced from its ground working position to a non-ground engaging, idle position, such means being responsive to the tool striking an immovable earthbound obstacle, such as an embedded stone or boulder.

The rotatable kinematic means of the present invention also accommodates easy, smooth, prompt restoration of the supported earth working tool to its ground working position following only partial displacement, not greater than a predetermined distance, toward the idle position, as, for example, when obliquely striking an earthbound obstacle or when uprooting a tenacious but movable buried obstacle. In this way, fewer resets of the earth working tool from the idle position to the ground engaging position are necessary while, at the same time, damage to the earth working tool and the support structure is minimized.

Attempts to prevent damage to earth working tools caused by impact striking of earthbound obstructions date from almost the inception of man's tillage of the soil. Prior efforts to cushion or reduce impact load on tillage equipment has continued up to the present time, for example, United States Patent No. 3,125,167. However, even these recent solutions are, or may be rendered obsolete by subsequent improvements in tractors, such as by increasing the speed and horsepower at which they operate, as a result of a continuing effort to improve efficiency of operation from the standpoint of time and cost. Consequently, each improvement in tractors almost inherently necessitates further search for more effective solutions of preventing impact damage to earth working tools which would otherwise be damaged by obstructions hidden in the soil.

Among the more difficult problems in trippable earth working tool support structures, in view of improved tractor technology, are provided a design which: (1) substantially alleviates vertical raising of the plow beam, to which the support mechanism earth working tools are seriatim attached, above its normal operative position responsive to the tool striking and moving over top of an immovable earthbound obstacle; (2) reduces the number of full trip displacements of the earth working tool from its working position to its idle position, thereby reducing the number of tool reset maneuvers required and, hence, permitting a greater area of earth to be worked during a given unit of time; (3) controls the torsional bending moment exerted by the earth against the plow beam through an offset mounted earth working tool to prevent binding of the tripping kinematic means such that release of the earth working tool to its idle position is not prevented, thereby avoiding permanent damage to the equipment; and (4) avoids erratic release or tripping of the earth working tool to the idle position.

Accordingly, it is a primary object of the present invention to provide a novel support mechanism, having selectively rotatable kinematic means, interposed between a plow beam and an earth working tool which reduces the number of times the tool is fully tripped or displaced from its working position to an idle, non-ground working, elevated position solely by rotational movement of the tool responsive to an impact load placed on the tool by striking an earth bound immovable obstacle, but which accommodates smoother transition than achievable with analogous prior art devices between the working and idle positions when full tripping or release is necessary.

The invention may embody, in combination, one or more of the following features:

(1) Provision for selectively biasing the earth working tool, independent of the plow beam, toward the working position until the rotational displacement of the tool exceeds a predetermined magnitude, at which time the tool is then selectively biased toward the idle position.

(2) Provision for displacing or tripping the tool solely by rotation without rectilinear movement;

(3) Provision of a pivot point situated at an elevated position near the plow beam and substantially vertically above the forward tip of the earth working tool whereby the point of the earth working tool, e.g., the point of a plow share, moves downwardly only slightly when being tripped from the working position to the idle position so as to essentially prevent vertical upward movement of the plow beam as the point of the tool, in the tripped position, passes over an obstacle;

(4) Provision for kinematic means to be interposed between a bias means and the earth working tool, arranged to smoothly co-act with the bias means during partial and full rotational displacement of the tool to first urge the tool toward restoration to its working position and upon further displacement to smoothly pilot or guide the tool to its idle position;

(5) Provision for kinematic means to distribute the tool displacement forces so as to either smoothly restore the tool to its working position or to smoothly trip the tool to its idle position, with imposition of only modest impact loads upon all components of the earth working equipment;

(6) Provision for rapid resetting of the tool from its idle, tripped position to its working position, to thereby increase efficiency by reducing labor costs and minimizing the "down time" and, hence, the cost per hour of operation of the tractor and earth working equipment;

(7) Provision for low torsional bending moment on the plow beam when the tool strikes an earthbound obstacle so as to prevent binding of the tripping apparatus and avert damage which would otherwise result; and (8) Provision for selective adjustment of the tripping mechanism to avoid erratic tripping and to minimize the weather effect upon the force at which tripping occurs.

Other objects and features of this invention will become apparent from the following description and appended claims in conjunction with the accompanying drawings, wherein:

URE 1 with the side gusset plate broken away for the purpose of illustrating the details of the trip mechanism, including the kinematic means. The solid lines indicate the earth working tool in its working position, and the dotted lines indicate the tripped, elevated idle position of the earth working tool; and FIGURE 3 is a side elevation partly broken away to illustrate the position assumed by the kinematic means of the mechanism following initial limited displacement of the earth working tool immediately before moving toward the position shown in dotted lines in FIGURE 2 responsive to striking an immovable earthbound obstacle.

*General description*

Figure 1:
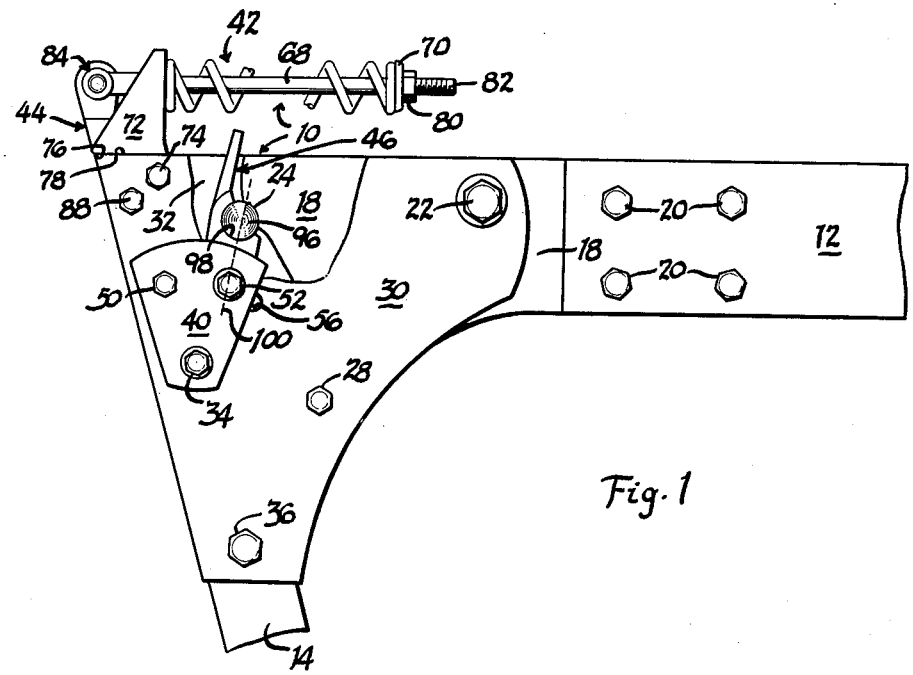
FIGURE 1 is a side elevation view of a presently preferred embodiment of the present invention adapted to support a depending earth working tool, such as a plow, and to be drawn by means of a plow beam and a tractor.

Referring now to the drawings wherein like parts are referred to by the same numeral throughout, FIGURE 1 shows the novel tripping mechanism 10 of the present invention in its installed ground working position. Tripping mechanism 10 is interposed between a substantially horizontal plow beam 14 and a plow standard 14 from which a plow share 16 is rigidly attached, as, for example, by bolts (see FIGURE 2). Plow share 16, standard 14 and beam 12 are conventional and form no part of the present invention.

Figure 3:
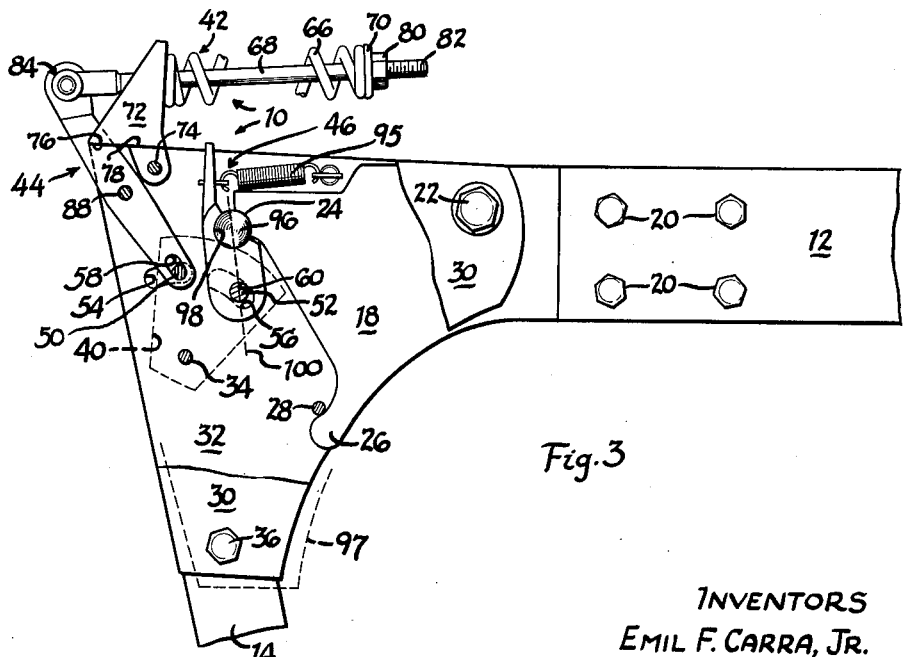
Figure 2:
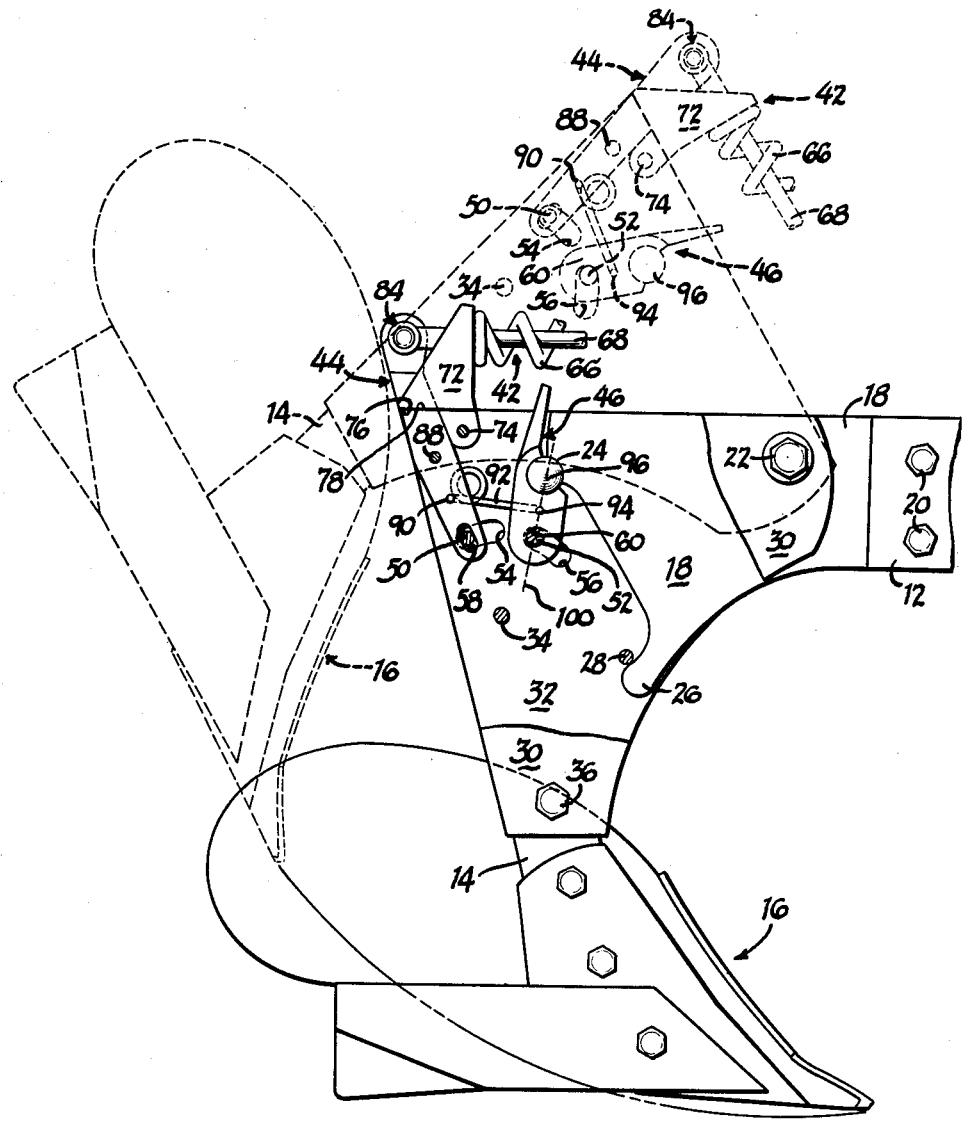
FIGURE 2 is a side elevation of the apparatus of FIG-

Stationary latch plate 18, best illustrated in FIGURES 2 and 3, is rigidly fastened to plow beam 12 as, for example, by bolts 20, so as to be sufficiently strong to resist the shear, bending moment and torsional loads imposed during high-speed plowing. Hence, plate 18 does not move during tripping of the plow share 16 and standard 14 from their working to idle positions. A pivot bolt 22 passes through latch plate 18 at an elevated position near the juncture between latch plate 18 and plow beam 12 for reasons hereinafter to be explained. Latch plate 18 is constructed at its rearward end, near standard 14, (1) to provide downwardly and rearwardly extending partial socket 24 to normally engage part of tripping mechanism 10 for reasons which will subsequently become evident, and (2) to provide downwardly and rearwardly extending arm 26 which acts as a stop against which pin 28 of tripping mechanism 10 strikes to locate plow share 16 in its working position.

Parallel gusset plates 30 and 32 comprise part of tripping mechanism 10 and are spaced from each other, being adjacent the two external sides of latch plate 18, respectively, in spaced relation thereto. Plates 30 and 32 are attached to pivot bolt 22, so as to rotate clockwise, as shown in the figures, about pivot bolt 22 when the plow share 16 and standard 14 are displaced from their working position toward their idle position. Additionally, gusset plates 30 and 32 are rigidly fastened to standard 14 by means of bolts 34 and 36 (see FIGURE 1). Consequently, there is no relative movement between gusset plates 30 and 32 and standard 14 or plow share 16 during displacement from the working position.

Relative movement between latch plate 18 and gusset plates 30 and 32 during displacement of plow share 16 from its working position is controlled through novel biasing and latching kinematic mechanisms best illustrated in FIGURES 2 and 3 where gusset plate 30 has been broken away for clarity of illustration.

This novel kinematic means includes external rocker plates 40 (see FIGURE 1), biasing means 42, spring trip or spring force varying mechanism 44 and latch arm mechanism 46 which is releasably biased against latch plate 18.

The two rocker plates 40 are adjacent the exterior face of gusset plates 30 and 32, respectively. Plates 40 are tied together by bolts 50 and 52 for joint movement so that both of plates 40 rotate in unison adjacent plates 30 and 32 during plow share displacement. Bolts 50 and 52 operate independent of plates 30 and 32, since they pass through arcuate slots 54 and 56 which are situated in both gusset plates 30 and 32, respectively. This construction accommodates limited relative movement between rocker plates 40 and gusset plates 30 and 32 during the tripping motion, as will be later explained.

Bolt 50 also passes through slot 58 of spring trip link 44, so that rotation of spring trip link 44 for a limited distance in a counterclockwise direction (i.e., opposite to the rotation of rocker plates 40) is induced by rotation of rocker plates 40 in a clockwise direction about bolt 34, as can be seen by a comparison of FIGURES 2 and 3. Similarlly, bolt 52 passes through aperture 60 of latching arm 46, so that counterclockwise rotation of arm 46 is induced by the aforesaid clockwise rotation of rocker plates 40.

Bias mechanism 42 includes compression spring 66 concentrically located about spring shaft 68. Spring 66 is normally precompressed between washer 70 and spring anchor 72, which is held in position by means of bolt 74 and by biasing surface 76 of spring anchor against surface 78 of gusset plates 30 and 32. For purposes of economy, two or more concentric springs may be used in place of spring 66.

The amount of precompression of spring 66 determines the amount of obstacle-induced force which must be exerted upon plow share 16 to cause displacement of the plow share. Spring anchor 72 is immovable and serves to transmit the force of compression spring 66 to surface 78 of gusset plates 30 and 32. This causes a resisting moment opposite to and of greater magnitude than the moment created by engagement of the moving plow with the earth. Both moments are effective about pivot bolt 22. The amount of compression in spring 66 is selectively settable by increments by appropriate rotation of bolt 80 along threaded end 82 of spring rod 68. In this way, the amount of plow share force necessary to trip the plow share from its working to idle position may be selectively controlled by incremental settings anywhere within the range of threads 82.

Spring trip link 44 is connected to rocker plates 40 at its lower end by bolt 50 and is rotatably attached at its upper end to spring rod 68. Further, spring trip link 44 is pivotably mounted to gusset plates 30 and 32 by bolt 88. Consequently, responsive to clockwise rotation of rocker plates 40, link 44 rotates counterclockwise about bolt 88, thereby increasing the magnitude of compression in spring 66.

Provision may also be made in spring trip link 44 for an aperture to receive end 90 of latching spring 92 (FIGURE 2). Latching spring 92 similarly engages an aperture in latch arm 46 at spring end 94, to thereby gently bias arm 46 against latch plate 18 during normal plowing operation. In the alternative, coiled latching spring 95 (see FIGURE 3) may be used in place of spring 92 for the same purpose. Apertured fittings, attached to arm 46 and plates 30 and 32, may be conveniently used to biasly position spring 95, as illustrated.

Latch arm 46, cantilevered from bolt 52, carries roller detent 96 partially encapsulated in bearingless race 98, which normally bears against partial socket 24 in force transmitting relation. Latch arm 46, as will become more apparent from the following description, is operative to move out of force transmitting engagement with partial socket 24 of latch plate 18 to permit full tripping of tripping mechanism 10 for moving the plow share 16 from its working to idle position to avoid damage thereto upon striking an immovable earthbound obstacle. Latch arm 46 is also arranged, in combination with bias mechanism 42, to urge plow share 16 to return to its working position following initial displacement of the plow share toward its idle position, for a predetermined distance. Roller detent 96 is always positioned in full peripheral contact with partial socket 24 when plow share 16 is in its working position. This is materially advantageous, since the load or force transmitted between the detent and socket is distributed over the entire peripheral contact rather than on a point or tangential contact as is prevalent in prior art structures. Consequently, the frequency of costly breakdown is materially alleviated.

*Operation*

In operation, when plow share 16 strikes an earthbound obstacle sufficient to overcome the resisting moment created by bias mechanism 42, plow share 16, standard 14, and tripping mechanism 10 initially rotate from the working position (shown in solid lines in FIGURE 2) to the position illustrated in FIGURE 3. Thereafter, if further obstacle resistance perseveres, the plow share, standard, and tripping mechanism smoothly rotate to the fully tripped, idle position shown in dotted lines in FIGURE 2. Phantom lines 97 of FIGURE 3 show the "at work" position of gusset plates 30 and 32 to illustrate the initial movement required for the tripping mechanism 10 to assume the position shown in solid lines in FIGURE 3. Whenever the force exerted by the obstacle upon the plow share 16 may be overcome, as, for example, by uprooting the obstacle or by obliquely striking the obstacle to drive it out of the course of movement of plow share 16, such that the displacement of plow share 16, standard 14 and tripping mechanism 10 is somewhere between the position illustrated in solid lines in FIGURE 2 and the position of FIGURE 3, the force of bias mechanism 42 will smoothly restore plow share 16, standard 14 and tripping mechanism 10 to the working position. This action significantly reduces the number of full trips which will occur per unit of time and thereby materially improves efficiency of operation.

When an earthbound obstacle is struck by plow share 16, plow share 16, standard 14 and tripping mechanism 10 rotate clockwise, as illustrated in the figures, about pivot bolt 22. Clockwise rotation of gussets 30 and 32, which move unitarily with standard 14 and plow share 16 as part of tripping mechanism 10, causes clockwise rotation of rocker plates 40 about bolt 34. This motion is resiliently resisted by latch arm 46 and by spring trip link 44 which are caused to rotate counterclockwise by the clockwise rotation of rocker plates 40, since they are interconnected to rocker plates 40 by means of bolts 50 and 52, respectively.

Counterclockwise rotation of spring trip link 44 about its pivot bolt 88 draws spring rod 68 toward the left, as shown in the figures, further compressing spring 66 and thereby increasing the resisting moment, created against face 78 of gusset plates 30 and 32 by engagement with face 76 of spring anchor 72. This increase in resisting moment caused by additional compression of spring 66 resiliently urges restoration of plow share 16 toward its working position, opposite to the displacement caused by the striking of the obstacle. Restoration is urged as long as roller detent 96 remains in abutting force transmitting relationship with partial socket 24 of latch plate 18.

However, displacement of plow share 16 away from its working position also creates a counterclockwise rotation of latch arm 46 about bolt 52, as bolt 52 moves toward the right within slot 56 in gusset plates 30 and 32. The plow share displacement force is transmitted by latch arm 46 to plate 18 through roller detent 96 and partial socket 24, while tripping mechanism 10 moves from the position in FIGURE 2, shown in solid lines, toward the position of FIGURE 3. The line of action of the force transmitted through latch arm 46 falls within the plane connecting the substantially horizontal axes of bolt 52 and roller detent 96, respectively. This line of action is identified as line 100 in the drawings, and normally falls within partial socket 24 to accommodate direct force transmission between roller detent 96 and stationary plate 18.

If the increased resisting moment, caused by additional compression of spring 66 responsive to rotation of spring trip link 44 caused by displacement rotation of rocker plates 40, is insufficient to overcome the moment caused by the force of the plow share 16 striking an obstacle, movement of plow share 16, standard 14 and gusset plates 30 and 32 continues in a clockwise direction about pivot bolt 22 until tripping mechanism 10 assumes that position shown in FIGURE 3. In this position, by inspection, it is seen that the line of action 100 of the force being transmitted by latch arm 46 to latch plate 18 through detent roller 96 and partial socket 24 falls outside partial socket 24. Hence, the force imparted by roller detent 96 is eccentric to the resistance of partial socket 24 and, as a result, roller detent 96 commences to roll upward along the rear face of latch plate 18 out of partial socket 24. This movement takes place with only modest impact load upon the entire structure which supports the plow and is regulated by the above-described coaction of the components of tripping mechanism 10, so as to smoothly permit plow share 16 to assume its fully tripped, idle position.

Movement of roller detent 96 out of partial socket 24 and away from stationary plate 18 accommodates return movement of bolt 52 toward the left within slot 56, thereby accommodating counterclockwise rotation of rocker plates 40 about bolt 34 and clockwise rotation of spring trip link 44 about bolt 88 to decrease the magnitude of the resisting movement caused by the compressive force exerted by spring 66 against surface 78 of gusset plates 30 and 32 through spring anchor 72. This enables plow share 16 to move from the position of FIGURE 3 toward its idle position against less resistance until the entire plow structure assumes the fully tripped position, as shown in dotted lines in FIGURE 2.

Once the obstacle has been cleared, the plow share is returned to its working position either by (1) raising the entire plowing implement causing trip mechanism 10 to return, by force of its own weight, to its working position, indicated in solid lines in FIGURE 2, or (2) reversing the implement's direction of movement, which pulls the plow share back into its working position by reason of its contact with the ground, as, for example, in the case of larger plows where the entire implement may not be conveniently raised.

While the foregoing description has been directed to a single plow share and tripping mechanism, it is to be appreciated the invention comprehends multiple plow share and tripping mechanism arrangements as is conventional in the art.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a breakback support mechanism interposed between an earth working tool and plow beam comprising stationary means attached to the plow beam and rotatable breakback means to which the tool is rigidly attached and which is rotatably coupled to said stationary means at a common pivot point, said rotatable breakback means and tool being rotationally displaceable about said pivot point from a ground working position to an idle position by the tool striking an immoveable obstacle, the improvement comprising kinematic means interposed between the stationary and rotatable breakback means for transmitting force from the rotatable breakback means to the stationary means upon the tool striking an obstacle including rocker means carried by the rotatable breakback means and moveable solely by rotation about one fixed pivot axis, latch means extending from the rocker means so as to be releasably urged against the stationary means, selectively settable resilient bias means mounted upon the rotatable breakback means, and pivotable link means interconnecting the selectively settable resilient bias means and the rocker means, said selectively settable resilient bias means being biased to exert a moment of predetermined magnitude in a direction opposite to the rotational displacement of the tool and rotatable breakback means between the working and the idle positions for precisely determining the magnitude of obstacle-induced force required for full tripping and for restoration of the tool to the working position when only partial tripping of the rotatable breakback means and the tool occurs.

2. The device of claim 1 wherein said bias means includes means for progressively increasing the magnitude of the moment exerted by the bias means upon the rotatable means as the tool and rotatable means are rotationally displaced for a predetermined distance from the working position toward the idle position and for decreasing the magnitude of the moment exerted by the bias means upon the rotatable means as the tool and rotatable means are rotationally displaced beyond said predetermined distance from the working position to the idle position.

3. In a breakback plow share tripping mechanism carried upon a plow beam comprising rigid mounting means and reciprocably selectively rotatable means to which the plow is fastened, said rotatable means being pivotable about pivot means having a substantially horizontal fixed pivot axis near an elevated portion of the juncture between said rigid means and said plow beam for displacement of the share and rotatable means between working and idle positions, bias means biased against said rotatable means creating a resisting moment about said pivot means' opposite to the plowing moment caused by engagement of the moving plow with the ground, and kinematic means including rocker means pivotally linked to the bias means and pivotally connected to said rotatable means along a second fixed pivot axis, said rocker means being pivoted about the second fixed pivot axis (1) forward toward the rigid mounting means as the rotatable means is initially displaced from the working position and (2) rearward away from the rigid mounting means as the rotatable means tends to complete its displacement to the idle position, and latch means releasably biased against a surface of said rigid mounting means for pivotal movement about a first latch pivot axis as said rocker means is pivoted forward and pivotally joined to said rocker means for pivotable movement about a second latch pivot axis counter to each pivot movement of said rocker means.

4. A device as defined in claim 3 wherein said bias means includes a compression spring, a spring rod and an anchor member directly biased against the rotatable means and further including force varying means for automatically varying the magnitude of force exerted by said bias means upon said rotatable means, which is pivotally connected at said rotatable means intermediate its ends and is attached to said pivotally connected means and said spring rod respectively at said ends for varying the magnitude of compression in said spring during displacement of said plow share and said rotatable means from the working position.

5. A device as defined in claim 3 wherein said interconnection between said pivotally connected means and said releasably biased means and said force varying means includes pivot pin means passing through last motion slots in said rotatable means.

6. In a support mechanism interposed between an earth working tool and a plow beam comprising a stationary plate attached to the plow beam and two rotatable gusset plates by which the tool is carried and which are rotatably coupled to said stationary plate at a common pivot point, said rotatable gusset plates and tool being rotationally displaceable about said pivot point from a ground working position to an idle position by the tool striking an immovable obstacle; the improvement comprising a kinematic mechanism interposed between said stationary plate and said rotatable gusset plates including a resilient precompressed spring assembly mounted upon and biased against the rotatable gusset plates, said kinematic mechanism including two jointly pivotable rocker plates pivotally secured to said rotatable gusset plates, respectively, at a single pivot point which has a fixed pivot axis, a cantilevered latch arm pivotably attached to said rocker plates and releasably biased against a partial socket in said stationary plate, and a link pivotally attached to said rotatable gusset plates and interconnecting said rocker plates and said precompressed spring assembly.

7. A plow share tripping mechanism carried upon a plow beam comprising rigid mounting means and selectively rotatable means upon which the plow share is carried, said rotatable means being pivotable about a pivot axis and carrying bias means biased against the rotatable means releasably biased against said rigid mounting means, and means for varying the magnitude of force exerted by the bias means upon said rotatable means during displacement of the plow share from its working position wherein said rotatable means carries pivotally connected means which are connected to respective ends of both said releasably biased means and said force varying means at spaced locations whereby, upon initial rotation of said rotatable means responsive to displacement of said plow share away from its earth working position, said pivotally connected means rotates about the fixed pivot axis progressively repositioning the respective interconnected ends of said releasably biased means and said force varying means causing said releasably biased means to directly transmit plow share displacement force to said stationary means, and causing said force varying means to increase said exerted force to urge return of said plow share to its working position and whereby, upon further rotation of said rotatable means, beyond a predetermined amount, responsive to further displacement of said plow share away from its earth working position, said pivotally connected means completes said rotation, the repositioning of said respective interconnected ends is completed, thereafter said releasably biased means is selectively released from force transmitting engagement with said stationary means, said force varying means causing reduction in said force exerted thereby smoothly accommodating full displacement of said plow share and rotatable means to an idle, inactive position.

8. A plow share tripping mechanism comprising selectively rotatable means interposed between a plow beam and a plow share including releasably biased means connected to the rotatable means and extending at one end from a pivot pin and biased against a stationary means essentially forming part of the plow beam, said releasably biased means having a roller detent partially encapsuled in a cylindrical race near a second end, said roller detent abutting a rearwardly and downwardly disposed partial socket surface in said stationary means to transmit plow share displacement force from said selectively rotatable means to said stationary means along a path which includes the axes of said pivot pin and said roller detent, so long as said plane falls within said partial socket surface, and for causing said roller detent to roll out of engagement with said partial socket surface when said plane falls outside said partial socket surface.

9. In a support mechanism interposed between an earth working tool and a plow beam comprising stationary means attached to the plow beam and rotatable means to which the tool is attached and which is rotatably coupled to said stationary means at a common pivot point, said rotatable means and tool being rotationally displaceable about said pivot point from a ground working position to an idle position in the response to the tool striking a substantially immoveable obstacle, the improvement comprising kinematic means interposed between said stationary and rotatable means including (1) rocker means pivotally secured to said rotatable means at a single pivot point, (2) resilient biasing means mounted upon and biased against the rotatable means and pivotably linked to said rocker means at a second pivot point to pivotally follow the movement of said rocker means without obstruction with the rotatable means and (3) projecting rocker latch means releasably biased against said stationary means at one end and pivotably attached at the other end to said rocker means to pivotally follow the movement of said rocker means without obstruction with the rotatable means.

References Cited by the Examiner
UNITED STATES PATENTS 3,125,167   3/1964   Mannheim et al. _____ 172—629

ABRAHAM G. STONE, *Primary Examiner.*

T. GRAHAM CRAVER, ANTONIO F. GUIDA,
*Examiners.*

UNITED STATES PATENT OFFICE
CERTIFICATE OF CORRECTION

Patent No. 3,223,176                              December 14, 1965

Emil F. Carra, Jr., et al.

It is hereby certified that error appears in the above numbered patent requiring correction and that the said Letters Patent should read as corrected below.

Column 1, line 51, for "provided" read -- providing --; column 7, line 64, for "last" read -- lost --; column 8, line 17, before "releasably" insert --, means --.

Signed and sealed this 26th day of July 1966.

(SEAL)
Attest:

ERNEST W. SWIDER                              EDWARD J. BRENNER
Attesting Officer                                 Commissioner of Patents